United States Patent
Joseph et al.

(10) Patent No.: US 11,135,883 B2
(45) Date of Patent: Oct. 5, 2021

(54) VEHICULAR SENSING SYSTEM WITH ULTRASONIC SENSOR AT TRAILER HITCH

(71) Applicant: Magna Electronics Inc., Auburn Hills, MI (US)

(72) Inventors: Harold E. Joseph, Brampton (CA); Jyothi P. Gali, Rochester Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 15/929,613

(22) Filed: May 13, 2020

(65) Prior Publication Data

US 2020/0361261 A1    Nov. 19, 2020

Related U.S. Application Data

(60) Provisional application No. 62/846,936, filed on May 13, 2019.

(51) Int. Cl.
*B60D 1/62* (2006.01)
*B62D 13/06* (2006.01)

(52) U.S. Cl.
CPC .............. *B60D 1/62* (2013.01); *B62D 13/06* (2013.01); *B60R 2300/406* (2013.01); *B60R 2300/8066* (2013.01)

(58) Field of Classification Search
CPC . B60D 1/36; B60D 1/363; B60D 1/62; B60D 15/02; B60D 15/029; B60D 15/06; B60Q 1/00; B60Q 1/0023; B60Q 9/006; B60Q 9/008; B60Q 1/30; B60Q 1/305; B60R 1/003; B62D 1/00; B62D 13/06
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,760,962 A | 6/1998 | Schofield et al. |
| 5,786,772 A | 7/1998 | Schofield et al. |
| 5,796,094 A | 8/1998 | Schofield et al. |
| 5,877,897 A | 3/1999 | Schofield et al. |
| 5,929,786 A | 7/1999 | Schofield et al. |
| 5,949,331 A | 9/1999 | Schofield et al. |
| 6,201,642 B1 | 3/2001 | Bos |
| 6,222,447 B1 | 4/2001 | Schofield et al. |
| 6,302,545 B1 | 10/2001 | Schofield et al. |
| 6,396,397 B1 | 5/2002 | Bos et al. |
| 6,498,620 B2 | 12/2002 | Schofield et al. |
| 6,523,964 B2 | 2/2003 | Schofield et al. |
| 6,611,202 B2 | 8/2003 | Schofield et al. |

(Continued)

*Primary Examiner* — Van T Trieu
(74) *Attorney, Agent, or Firm* — Honigman LLP

(57) ABSTRACT

A vehicular backup assist system includes an ultrasonic sensor disposed at a trailer hitch that is configured to be attached at a rear portion of the vehicle. A control includes a processor for processing sensor data captured by the ultrasonic sensor. The control, with the trailer hitch attached at the vehicle, and during a reversing maneuver of the vehicle, and responsive to processing of sensor data captured by the ultrasonic sensor, detects presence of an object rearward of the vehicle and in the vicinity of the trailer hitch. Responsive to detecting presence of the object, the control alerts a driver of the vehicle of the detection.

18 Claims, 2 Drawing Sheets

(56) References Cited

U.S. PATENT DOCUMENTS

| | | |
|---|---|---|
| 6,636,258 B2 | 10/2003 | Strumolo |
| 6,690,268 B2 | 2/2004 | Schofield et al. |
| 6,717,610 B1 | 4/2004 | Bos et al. |
| 6,757,109 B2 | 6/2004 | Bos |
| 6,802,617 B2 | 10/2004 | Schofield et al. |
| 6,806,452 B2 | 10/2004 | Bos et al. |
| 6,822,563 B2 | 11/2004 | Bos et al. |
| 6,882,287 B2 | 4/2005 | Schofield |
| 6,891,563 B2 | 5/2005 | Schofield et al. |
| 6,946,978 B2 | 9/2005 | Schofield |
| 7,005,974 B2 | 2/2006 | McMahon et al. |
| 7,038,577 B2 | 5/2006 | Pawlicki et al. |
| 7,145,519 B2 | 12/2006 | Takahashi et al. |
| 7,161,616 B1 | 1/2007 | Okamoto et al. |
| 7,230,640 B2 | 6/2007 | Regensburger et al. |
| 7,248,283 B2 | 7/2007 | Takagi et al. |
| 7,295,229 B2 | 11/2007 | Kumata et al. |
| 7,301,466 B2 | 11/2007 | Asai |
| 7,592,928 B2 | 9/2009 | Chinomi et al. |
| 7,720,580 B2 | 5/2010 | Higgins-Luthman |
| 7,859,565 B2 | 12/2010 | Schofield et al. |
| 7,881,496 B2 | 2/2011 | Camilleri et al. |
| 8,694,224 B2 | 4/2014 | Chundrlik, Jr. et al. |
| 8,818,042 B2 | 8/2014 | Schofield et al. |
| 8,886,401 B2 | 11/2014 | Schofield et al. |
| 8,917,169 B2 | 12/2014 | Schofield et al. |
| 9,036,026 B2 | 5/2015 | Dellantoni et al. |
| 9,068,390 B2 | 6/2015 | Ihlenburg et al. |
| 9,077,098 B2 | 7/2015 | Latunski |
| 9,077,962 B2 | 7/2015 | Shi et al. |
| 9,085,261 B2 | 7/2015 | Lu et al. |
| 9,090,234 B2 | 7/2015 | Johnson et al. |
| 9,092,986 B2 | 7/2015 | Salomonsson et al. |
| 9,126,525 B2 | 9/2015 | Lynam et al. |
| 9,140,789 B2 | 9/2015 | Lynam |
| 9,146,898 B2 | 9/2015 | Ihlenburg et al. |
| 9,174,574 B2 | 11/2015 | Salomonsson |
| 9,205,776 B2 | 12/2015 | Turk |
| 9,233,641 B2 | 1/2016 | Sesti et al. |
| 10,071,687 B2 | 9/2018 | Ihlenburg et al. |
| 2003/0098786 A1* | 5/2003 | Bishop .................. B60Q 9/006 340/435 |
| 2005/0285371 A1* | 12/2005 | Ramsey .................. B60D 1/06 280/477 |
| 2006/0255560 A1* | 11/2006 | Dietz .................. B60D 1/36 280/477 |
| 2013/0002873 A1 | 1/2013 | Hess |
| 2013/0141578 A1 | 6/2013 | Chundrlik, Jr. et al. |
| 2013/0215271 A1 | 8/2013 | Lu |
| 2013/0222593 A1 | 8/2013 | Byrne et al. |
| 2013/0242099 A1 | 9/2013 | Sauer et al. |
| 2013/0258077 A1 | 10/2013 | Bally et al. |
| 2013/0278769 A1 | 10/2013 | Nix et al. |
| 2013/0298866 A1 | 11/2013 | Vogelbacher |
| 2013/0300869 A1 | 11/2013 | Lu et al. |
| 2013/0314503 A1 | 11/2013 | Nix et al. |
| 2014/0005907 A1 | 1/2014 | Bajpai |
| 2014/0025240 A1 | 1/2014 | Steigerwald et al. |
| 2014/0028852 A1 | 1/2014 | Rathi |
| 2014/0049646 A1 | 2/2014 | Nix |
| 2014/0052340 A1 | 2/2014 | Bajpai |
| 2014/0067206 A1 | 3/2014 | Pflug |
| 2014/0085472 A1 | 3/2014 | Lu et al. |
| 2014/0098229 A1 | 4/2014 | Lu et al. |
| 2014/0103619 A1* | 4/2014 | Motts .................. B60D 1/30 280/511 |
| 2014/0104426 A1 | 4/2014 | Boegel et al. |
| 2014/0138140 A1 | 5/2014 | Sigle |
| 2014/0139676 A1 | 5/2014 | Wierich |
| 2014/0152825 A1 | 6/2014 | Schaffner |
| 2014/0160276 A1 | 6/2014 | Pliefke et al. |
| 2014/0160291 A1 | 6/2014 | Schaffner |
| 2014/0168415 A1 | 6/2014 | Ihlenburg et al. |
| 2014/0168437 A1 | 6/2014 | Rother et al. |
| 2014/0211009 A1 | 7/2014 | Fursich |
| 2014/0218535 A1 | 8/2014 | Ihlenburg et al. |
| 2014/0226012 A1 | 8/2014 | Achenbach |
| 2014/0232869 A1 | 8/2014 | May et al. |
| 2014/0247352 A1 | 9/2014 | Rathi et al. |
| 2014/0247354 A1 | 9/2014 | Knudsen |
| 2014/0247355 A1 | 9/2014 | Ihlenburg |
| 2014/0249723 A1* | 9/2014 | Pilutti .................. B60D 1/245 701/42 |
| 2014/0293042 A1 | 10/2014 | Lynam |
| 2014/0293057 A1 | 10/2014 | Wierich |
| 2014/0307095 A1 | 10/2014 | Wierich |
| 2014/0309884 A1 | 10/2014 | Wolf |
| 2014/0313339 A1 | 10/2014 | Diessner |
| 2014/0320636 A1 | 10/2014 | Bally et al. |
| 2014/0320658 A1 | 10/2014 | Pliefke |
| 2014/0327772 A1 | 11/2014 | Sahba |
| 2014/0327774 A1 | 11/2014 | Lu et al. |
| 2014/0336876 A1 | 11/2014 | Gieseke et al. |
| 2014/0340510 A1 | 11/2014 | Ihlenburg et al. |
| 2014/0347486 A1 | 11/2014 | Okouneva |
| 2015/0002670 A1 | 1/2015 | Bajpai |
| 2015/0217693 A1 | 8/2015 | Pliefke et al. |
| 2017/0043807 A1* | 2/2017 | Shepard .................. B60D 1/36 |
| 2017/0050672 A1 | 2/2017 | Gieseke et al. |
| 2017/0217372 A1 | 8/2017 | Lu et al. |
| 2017/0254873 A1 | 9/2017 | Koravadi |
| 2018/0208241 A1* | 7/2018 | Shepard .................. B60D 1/62 |
| 2018/0211528 A1 | 7/2018 | Seifert |
| 2018/0215382 A1 | 8/2018 | Gupta et al. |
| 2018/0253608 A1 | 9/2018 | Diessner et al. |
| 2018/0276838 A1 | 9/2018 | Gupta et al. |
| 2018/0276839 A1 | 9/2018 | Diessner et al. |
| 2019/0016264 A1 | 1/2019 | Potnis et al. |
| 2019/0064831 A1 | 2/2019 | Gali et al. |

\* cited by examiner

VEHICULAR SENSING SYSTEM WITH ULTRASONIC SENSOR AT TRAILER HITCH

CROSS REFERENCE TO RELATED APPLICATION

The present application claims the filing benefits of U.S. provisional application Ser. No. 62/846,936, filed May 13, 2019, which is hereby incorporated herein by reference in its entirety.

FIELD OF THE INVENTION

The present invention relates generally to a vehicle vision system for a vehicle and, more particularly, to a vehicle vision system that utilizes one or more exterior sensors at a vehicle.

BACKGROUND OF THE INVENTION

Use of sensors in vehicle sensing systems is common and known. Such sensors are integrated at the vehicle and may sense areas rearward of the vehicle to assist the driver in reversing the vehicle.

SUMMARY OF THE INVENTION

The present invention provides a driver assistance system or trailer assist system for a vehicle that utilizes one or more sensors to capture sensor data representative of the presence of objects exterior of the vehicle. The system includes an ultrasonic sensor disposed at a trailer hitch, and the hitch is detachably attached at the vehicle. The system also includes a control with a processor for processing sensor data captured by the ultrasonic sensor. The control, responsive to processing of sensor data captured by the ultrasonic sensor when the trailer hitch is attached at the vehicle, detects the presence of an object in the vicinity of the hitch and notifies or alerts a driver of the vehicle of the detection.

These and other objects, advantages, purposes and features of the present invention will become apparent upon review of the following specification in conjunction with the drawings.

DESCRIPTION OF THE PREFERRED EMBODIMENTS

A hitch warning system or vehicle maneuvering system or trailer assist system and/or driving assist system operates to capture sensor data exterior of the vehicle and of a trailer hitch attached at the vehicle and may process the sensor data to detect objects (such as another vehicle or a pedestrian or child or pet or the like) near the vehicle, such as to assist a driver of the vehicle in maneuvering the vehicle in a rearward direction. The trailer assist system includes a processor or processing system that is operable to receive sensor data from one or more sensors.

The sensor or the system may comprise a camera and the system may provide an output to a display device for displaying notifications of detected objects (such as objects detected by image processing of image data captured by the camera). Optionally, the system may provide a display, such as a rearview display or a top down or bird's eye or surround view display or the like (via capturing image data by a plurality of exterior viewing cameras at the vehicle, such as a forward viewing camera, sideward viewing cameras and a rearward viewing camera).

Figure 1:
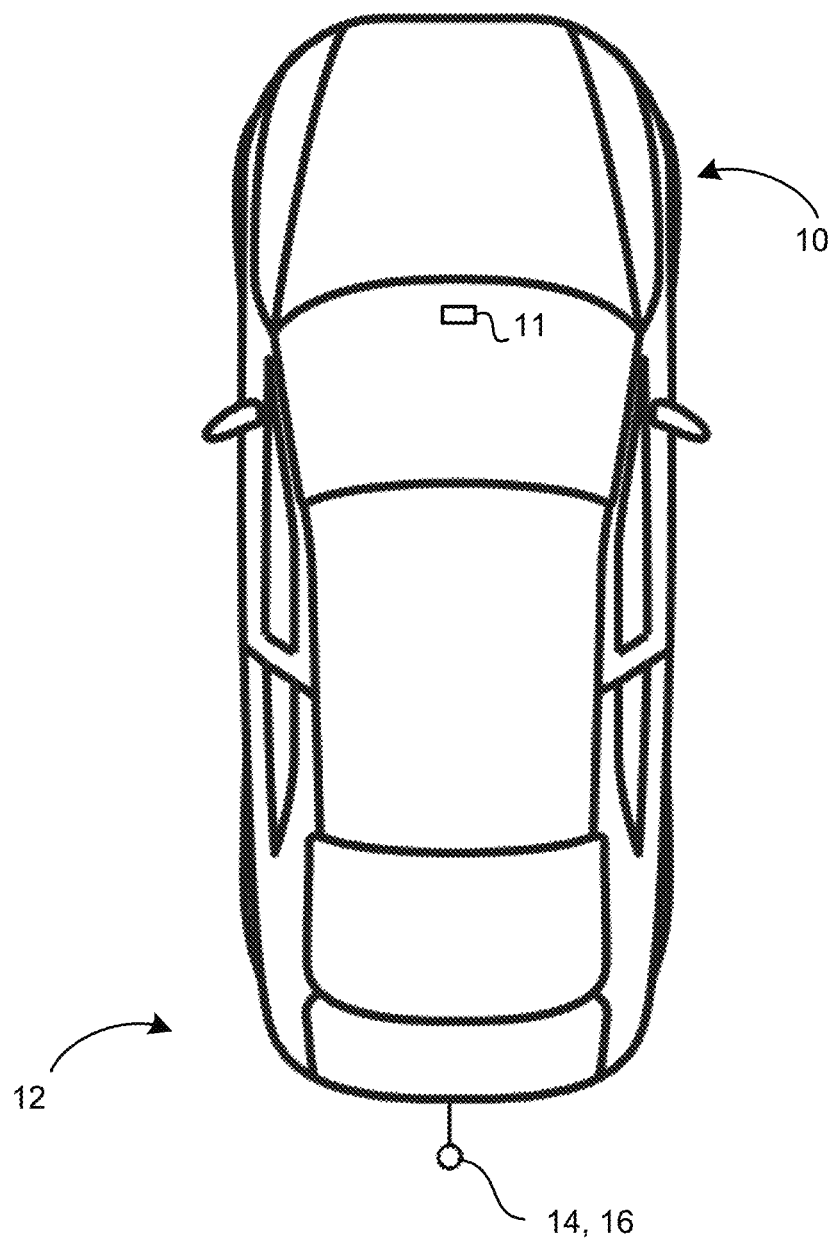
FIG. 1 is a plan view of a vehicle with a vision system that incorporates cameras in accordance with the present invention.

Referring now to the drawings and the illustrative embodiments depicted therein, a vehicle 10 includes a trailer maneuver assist system 12 that is operable to assist in backing up or reversing the vehicle with a trailer hitch 14 attached at the vehicle, and the system may maneuver the vehicle 10 toward a desired or selected location (or may generate an alert if an object is detected that is in the path of reverse travel of the vehicle). The trailer assist system 12 includes at least one exterior sensing sensor, such as an ultrasonic sensor 16 (and the system may optionally include multiple sensors), which captures sensor data representative of the scene exterior and rearward of the vehicle 10, with the field of sensing of the sensor encompassing the trailer hitch 14 (FIG. 1). The trailer assist system 12 includes a control 11 or electronic control unit (ECU) having electronic circuitry and associated software, with the circuitry including a data processor that is operable to process sensor data captured by the sensor or sensors and that may detect objects or the like and/or provide displayed images at a display device for viewing by the driver of the vehicle (the control and/or display device may be part of or incorporated in or at an interior rearview mirror assembly of the vehicle, or the control and/or the display device may be disposed elsewhere at or in the vehicle). The data transfer or signal communication from the sensor to the ECU may comprise any suitable data or communication link, such as a vehicle network bus or the like of the equipped vehicle.

Many driving assistance and parking assistance systems include ultrasonic sensors at the bumpers of vehicles. The sensors are able to detect the presence of obstacles when the sensor (and therefore, the bumper) is within a threshold distance of the obstacles. However, a trailer hitch that is mounted at a vehicle hitch receiver may extend well beyond the bumper of the vehicle (e.g., between 6 and 12 inches). Thus, ultrasonic sensors installed at the bumper (or elsewhere) of the vehicle may fail to detect an object or provide inaccurate warnings to the driver before a collision between the hitch and object. That is, the hitch may collide with the obstacle while the sensor(s) detect that the obstacle is still 6 to 12 inches away.

Figure 2:
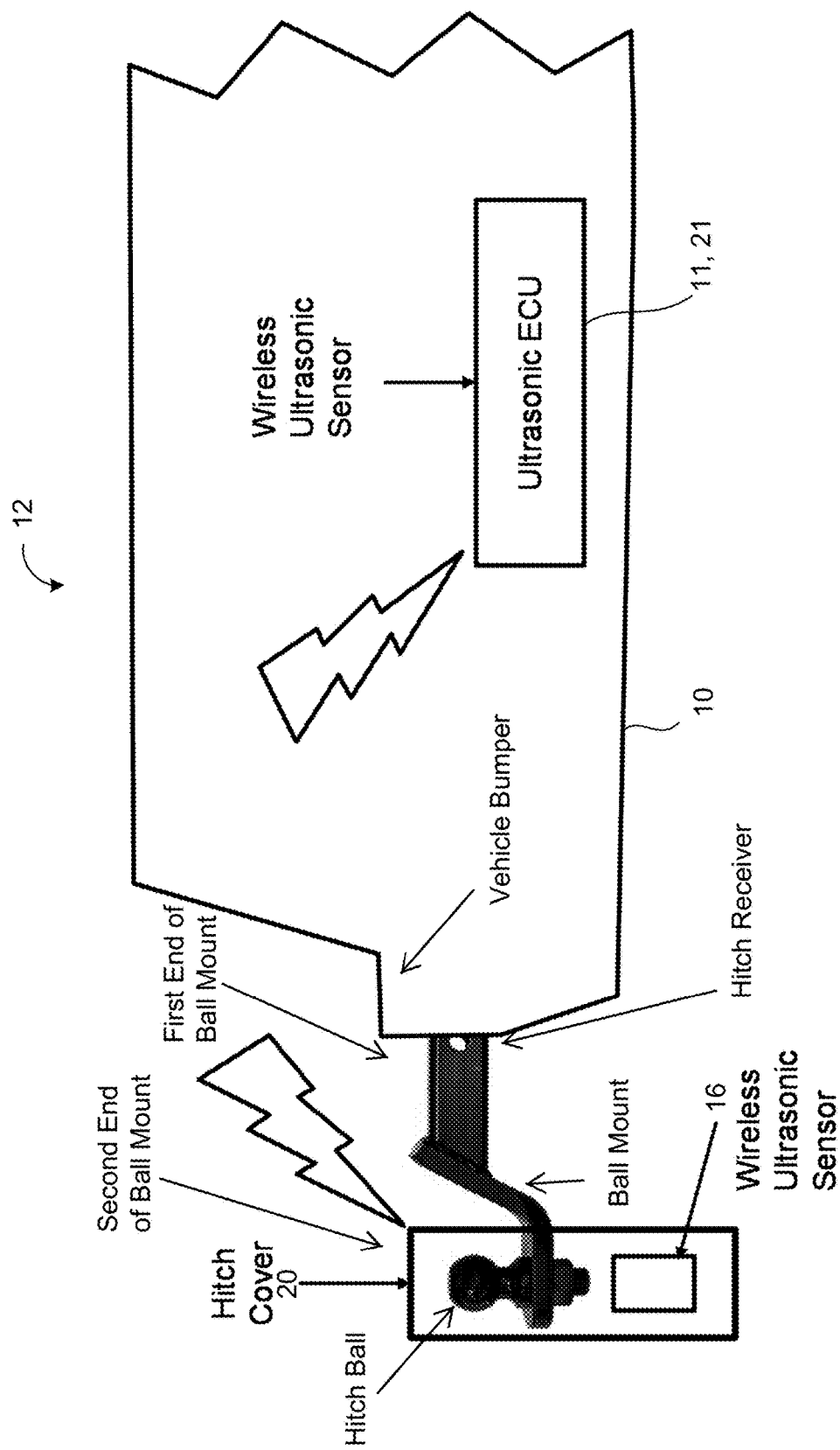
FIG. 2 is a schematic view of a hitch ultrasonic sensor in communication with a control of the vehicle.

Referring now to FIG. 2, implementations of the present invention include the trailer assist system that includes a hitch cover 20 (i.e., a cover or shell or plug that is attached to the hitch) with an attached or integrated hitch ultrasonic sensor 16. The hitch ultrasonic sensor 16 detects the presence of objects near the hitch 20 and may communicate the detection data wirelessly (e.g., via BLUETOOTH, WiFi, etc.) to the ECU 11, 21 of the vehicle. By placing or locating the sensor 16 at the hitch (such as at or near the ball of the trailer hitch at the rearmost portion of the trailer hitch), the system provides enhanced and more accurate alerts based on proximity of an object to the rearmost portion of the vehicle (the attached trailer hitch) instead of the bumper. The sensor may sense the area immediately rearward of the hitch and may sense the area below the hitch.

The hitch ultrasonic sensor 16, in some examples, is powered by a removable or rechargeable battery (e.g., a lithium ion battery). The sensor may also be powered by the vehicle (e.g., via a trailer connector). In some implementations, the system includes more than one sensor (e.g., an array of sensors) around the hitch cover 20 for multiple fields of sensing. Sensors other than ultrasonic sensors may be used to detect the proximity of objects (e.g., Infra-red Sensors, radar sensors, time-of-flight sensors, etc.). The ECU 11, 21, when the hitch ultrasonic sensor 16 indicates that an object is within a threshold distance of the hitch 20, generates a warning for an operator of the vehicle 10 and/or controls a system of the vehicle 10 (e.g., engages the brakes).

The ECU that receives the hitch ultrasonic data may be the primary vehicle ECU 11 or it may be a secondary ultrasonic ECU 21. For example, the system may be packaged as an aftermarket "kit" that may be equipped to a vehicle after the vehicle has been manufactured. The control or ECU may be a portable self-contained unit that is placed in the vehicle when the trailer hitch is attached at the vehicle, and/or the control may be part of a user's smartphone, which wirelessly pairs with and communicates with (such as by using BLUETOOTH technology) the sensor at the trailer hitch and which may receive vehicle information or data, such as data indicative of the vehicle being in reverse gear or traveling in reverse. An app of the smartphone may operate to process the data wirelessly received from the sensor at the trailer hitch to detect presence of an object, and the smartphone may generate an alert, such as a visible display on the screen of the smartphone or such as an audible alert (and optionally, the smartphone may communicate with the vehicle systems to generate an audible alert via the speakers of the vehicle and/or a visible alert via a display screen of the vehicle).

In other examples, the hitch ultrasonic sensor communicates with the primary ECU 11. The ECU may be configured to communicate with the hitch ultrasonic sensor at manufacturing or after manufacturing (e.g., by "pairing" a BLUETOOTH device). In yet other examples, the ultrasonic sensor (or sensors) is integrated directly into the hitch (e.g., the ball of the trailer hitch) and either wirelessly or via a wire (e.g., a wire routed through the hitch and through the vehicle) communicates with the primary ECU 11. The primary ECU may also communicate with other sensors (e.g., ultrasonic sensors or radar sensors disposed at the bumper of the vehicle) and/or any other sensors equipped at the vehicle.

Either the primary ECU 11 or a secondary ECU 21 may be configured to generate an alert when the hitch ultrasonic sensor detects the presence of an object within a threshold distance of the sensor and the hitch. For example, an audible tone may be emitted (e.g., by speakers in communication with the ECU), a light (e.g., an LED) may be enabled, or a notification/warning/alert may be displayed on a display. In some examples, the display is an integrated vehicle display. The alert or warning may change depending on the distance to the object. For example, an audible tone may increase in frequency or intensity the closer the object is to the hitch. That is, as the vehicle reverses toward the object, the ECU may indicate a relative or absolute distance between the hitch and the detected object to the driver of the vehicle.

Thus, the present invention provides a sensor, such as, for example, an ultrasonic sensor, disposed at or near or integrated at the trailer hitch of a vehicle to provide improved ability to generate an alert before the hitch impacts an object rearward of the vehicle during a reversing maneuver of the vehicle. The ultrasonic sensor detects the presence of objects near the hitch and communicates this detection to an ECU. The ECU generates a notification or warning or alert for a driver of the vehicle, indicating the presence of the object near the hitch. Optionally, the sensor at the trailer hitch may comprise a camera or other sensor that views or senses the area immediately surrounding the trailer hitch, with image data captured by the camera being processed for object detection.

The system may utilize aspects of the trailering or trailer angle detection systems or trailer hitch assist systems described in U.S. Pat. No. 9,085,261; 7,005,974; and/or 6,690,268, and/or U.S. Publication Nos. US-2019-0064831; US-2019-0016264; US-2018-0276839; US-2018-0276838; US-2018-0253608; US-2018-0215382; US-2018-0211528; US-2017-0254873; US-2017-0217372; US-2017-0050672; US-2015-0217693; US-2014-0160276; US-2014-0085472 and/or US-2015-0002670, which are hereby incorporated herein by reference in their entireties.

The vehicle may include any type of sensor or sensors, such as imaging sensors or radar sensors or lidar sensors or ultrasonic sensors or the like. For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular backup assist system, the vehicular backup assist system comprising:
    an ultrasonic sensor disposed at a trailer hitch ball at a ball mount that is configured to be coupled to a hitch receiver of a vehicle;

wherein the ball mount has a first end and a second end, and wherein the first end is configured to be coupled to the hitch receiver, and wherein the trailer hitch ball is disposed at the second end opposite the first end of the ball mount, and wherein the trailer hitch ball is configured to couple to a trailer coupler of a trailer;

wherein, when the ball mount is coupled to the hitch receiver at the vehicle, the second end of the ball mount extends rearward of a rear bumper of the vehicle to space the trailer hitch ball rearward from the rear bumper of the vehicle;

a trailer hitch ball cover, wherein the trailer hitch ball cover is configured to be disposed at and at least partially encompass the trailer hitch ball, wherein the ultrasonic sensor is disposed at the trailer hitch ball cover so as to be disposed at the trailer hitch ball when the trailer hitch ball cover is disposed at the trailer hitch ball;

wherein the ultrasonic sensor, when the ball mount is coupled to the hitch receiver at the vehicle and the trailer hitch ball cover is disposed at the trailer hitch ball, is spaced rearward of the rear bumper of the vehicle;

a control comprising electronic circuitry and associated software, wherein the electronic circuitry includes a processor for processing sensor data captured by the ultrasonic sensor;

wherein the control, with the ball mount coupled to the hitch receiver at the vehicle and the trailer hitch ball cover disposed at the trailer hitch ball, and during a reversing maneuver of the vehicle, and responsive to processing of sensor data captured by the ultrasonic sensor at the trailer hitch ball, detects presence of an object rearward of the vehicle and in the vicinity of the trailer hitch ball; and wherein the control, responsive to detecting presence of the object, alerts a driver of the vehicle of the detection of the presence of the object.

2. The vehicular backup assist system of claim 1, wherein the ultrasonic sensor comprises a wireless ultrasonic sensor, and wherein the control wirelessly receives the sensor data from the wireless ultrasonic sensor.

3. The vehicular backup assist system of claim 2, wherein the wireless ultrasonic sensor comprises a BLUETOOTH wireless ultrasonic sensor.

4. The vehicular backup assist system of claim 1, wherein, during the reversing maneuver of the vehicle, the control processes sensor data captured by the ultrasonic sensor at the trailer hitch ball cover and sensor data captured by a plurality of ultrasonic sensors at the rear bumper of the vehicle.

5. The vehicular backup assist system of claim 1, further comprising a display, and wherein the control, responsive to detecting the presence of the object, alerts the driver of the vehicle of the detection of the presence of the object via the display.

6. The vehicular backup assist system of claim 1, wherein the alert comprises an audible alert.

7. The vehicular backup assist system of claim 1, wherein the control is integrated into the vehicle.

8. The vehicular backup assist system of claim 1, wherein the control is independent from the vehicle.

9. The vehicular backup assist system of claim 1, wherein the ultrasonic sensor is powered via a battery disposed at the trailer hitch ball cover.

10. A vehicular backup assist system, the vehicular backup assist system comprising:

a trailer hitch ball cover, and wherein the trailer hitch ball cover is configured to be disposed at and encompass a trailer hitch ball at a ball mount that is configured to couple to a hitch receiver of a vehicle, wherein the ball mount has a first end and a second end, and wherein the first end is configured to be coupled to the hitch receiver, and wherein the trailer hitch ball is disposed at the second end opposite the first end of the ball mount;

wherein the trailer hitch ball extends rearward of a rear bumper of the vehicle when the ball mount is coupled to the hitch receiver of the vehicle;

a wireless ultrasonic sensor disposed at the trailer hitch ball cover;

a control comprising electronic circuitry and associated software, wherein the electronic circuitry includes a processor for processing sensor data captured by the wireless ultrasonic sensor and wirelessly communicated to the control;

wherein the control, with the trailer hitch ball cover disposed at the trailer hitch ball rearward of the rear bumper of the vehicle, and during a reversing maneuver of the vehicle, and responsive to processing of sensor data captured by the wireless ultrasonic sensor, detects presence of an object rearward of the vehicle and in the vicinity of the trailer hitch ball; and wherein the control, responsive to detecting presence of the object, audibly alerts a driver of the vehicle of the detection of the presence of the object.

11. The vehicular backup assist system of claim 10, wherein the wireless ultrasonic sensor wirelessly communicates captured sensor data to the control utilizing BLUETOOTH technology.

12. The vehicular backup assist system of claim 10, wherein, during the reversing maneuver of the vehicle, the control processes sensor data captured by the wireless ultrasonic sensor at the trailer hitch ball and sensor data captured by a plurality of wireless ultrasonic sensors at the rear bumper of the vehicle.

13. The vehicular backup assist system of claim 10, further comprising a display, and wherein the control, responsive to detecting the presence of the object, alerts the driver of the vehicle of the detection of the presence of the object via the display.

14. The vehicular backup assist system of claim 10, wherein the control is independent from the vehicle.

15. A vehicular backup assist system, the vehicular backup assist system comprising:

an ultrasonic sensor disposed at a trailer hitch ball at a ball mount that is configured to be coupled to a hitch receiver of a vehicle, wherein the ball mount has a first end and a second end, and wherein the first end is configured to be coupled to the hitch receiver, and wherein the trailer hitch ball is disposed at the second end opposite the first end of the ball mount;

wherein the trailer hitch ball extends rearward of a rear bumper of the vehicle when the ball mount is coupled to the hitch receiver of the vehicle, and wherein the ultrasonic sensor is powered via a battery disposed at the trailer hitch ball;

a control comprising electronic circuitry and associated software, wherein the electronic circuitry includes a processor for processing sensor data captured by the ultrasonic sensor;

wherein the control is independent from the vehicle;

wherein the control, with the ball mount coupled to the hitch receiver of the vehicle, and during a reversing maneuver of the vehicle, and responsive to processing of sensor data captured by the ultrasonic sensor, detects presence of an object rearward of the vehicle and in the vicinity of the trailer hitch ball; and wherein the control, responsive to detecting presence of the object, alerts a driver of the vehicle of the detection of the presence of the object.

16. The vehicular backup assist system of claim 15, wherein the alert comprises an audible alert.

17. The vehicular backup assist system of claim 15, wherein the ultrasonic sensor comprises a wireless ultrasonic sensor, and wherein the control wirelessly receives the sensor data from the wireless ultrasonic sensor.

18. The vehicular backup assist system of claim 15, wherein the ultrasonic sensor is integrated into the trailer hitch ball.

\* \* \* \* \*